US010637327B2

(12) United States Patent
Niekamp

(10) Patent No.: US 10,637,327 B2
(45) Date of Patent: Apr. 28, 2020

(54) ACTUATOR FOR ADJUSTING AN ACTUATING DEVICE

(71) Applicant: Mahle International GmbH, Stuttgart (DE)

(72) Inventor: Peer Niekamp, Leutenbach (DE)

(73) Assignee: Mahle International GmbH (DE)

( * ) Notice: Subject to any disclaimer, the term of this patent is extended or adjusted under 35 U.S.C. 154(b) by 9 days.

(21) Appl. No.: 15/753,436

(22) PCT Filed: Aug. 4, 2016

(86) PCT No.: PCT/EP2016/068669
§ 371 (c)(1),
(2) Date: Feb. 19, 2018

(87) PCT Pub. No.: WO2017/029124
PCT Pub. Date: Feb. 23, 2017

(65) Prior Publication Data
US 2018/0241282 A1    Aug. 23, 2018

(30) Foreign Application Priority Data

Aug. 18, 2015   (DE) .......................... 10 2015 215 732

(51) Int. Cl.
*F16K 31/04* (2006.01)
*H02K 7/116* (2006.01)
(Continued)

(52) U.S. Cl.
CPC ............ *H02K 7/116* (2013.01); *F02B 37/183* (2013.01); *F02B 37/24* (2013.01); *F02M 26/54* (2016.02);
(Continued)

(58) Field of Classification Search
CPC ..... F02M 26/54; F16K 31/041; F16K 31/042; F16K 31/043; F16K 31/53; F16K 31/535; F16H 1/20; F16H 1/206
(Continued)

(56) References Cited

U.S. PATENT DOCUMENTS 376,146 A    1/1888   Ensign
1,502,456 A  7/1924   Bee
(Continued)

FOREIGN PATENT DOCUMENTS

CN   102797795 A   11/2012
DE     8702420 U1   4/1987
(Continued)

OTHER PUBLICATIONS

English abstract for EP-1662120.
(Continued)

*Primary Examiner* — Matthew W Jellett
(74) *Attorney, Agent, or Firm* — Fishman Stewart PLLC

(57) ABSTRACT

A motor vehicle may include at least one actuating element and at least one actuator for adjusting the at least one actuating element. The at least one actuator may include a servomotor including an input shaft, and an output shaft rotatably mounted axially parallel the input shaft and radially spaced apart from the input shaft. The at least one actuating element may be drivingly connected to the output shaft and the output shaft may be configured to adjust the at least one actuating element. The at least one actuator may further include an input gear, an output gear, at least one input intermediate unit including a first input gear and a second input gear, and at least one output intermediate unit including a first output gear and a second output gear.

21 Claims, 7 Drawing Sheets

(51) Int. Cl.
*F02M 26/54* (2016.01)
*F02B 37/18* (2006.01)
*F02B 37/24* (2006.01)
*F02M 35/10* (2006.01)
*F16H 19/00* (2006.01)
*H02K 5/167* (2006.01)
*H02K 7/00* (2006.01)
*F16H 1/20* (2006.01)
*H02K 11/215* (2016.01)

(52) U.S. Cl.
CPC ..... *F02M 35/10157* (2013.01); *F16H 19/001* (2013.01); *F16K 31/043* (2013.01); *H02K 5/1675* (2013.01); *H02K 7/003* (2013.01); *F16H 1/20* (2013.01); *H02K 11/215* (2016.01); *Y02T 10/144* (2013.01)

(58) Field of Classification Search
USPC .......................................... 251/129.11, 250.5
See application file for complete search history.

(56) References Cited

U.S. PATENT DOCUMENTS

| | | | | |
|---|---|---|---|---|
| 5,058,456 | A * | 10/1991 | Manrique | F16H 1/20 74/606 R |
| 6,135,415 | A * | 10/2000 | Kloda | F02M 26/21 123/568.18 |
| 6,318,200 | B1 * | 11/2001 | Coleman | B60K 17/043 180/9.62 |
| 6,601,467 | B1 * | 8/2003 | Futterer | F16H 1/20 74/413 |
| 7,669,581 | B2 * | 3/2010 | Sasaki | F02D 9/04 123/399 |
| 7,946,555 | B2 * | 5/2011 | Ikeda | F02D 9/105 251/129.11 |
| 8,297,150 | B2 | 10/2012 | Dismon et al. | |
| 8,770,544 | B2 * | 7/2014 | Kim | F02B 37/186 251/129.11 |
| 2002/0059844 | A1 | 5/2002 | Leung | |
| 2004/0103733 | A1 | 6/2004 | Sumita et al. | |
| 2008/0308079 | A1 * | 12/2008 | Albert | F16K 3/10 123/568.11 |
| 2009/0039725 | A1 | 2/2009 | Kanatani et al. | |
| 2017/0198784 | A1 * | 7/2017 | Soubjaki | F16H 1/20 |
| 2018/0202350 | A1 * | 7/2018 | Niekamp | F02B 37/186 |
| 2019/0002097 | A1 * | 1/2019 | Nakamura | B64C 33/02 |

FOREIGN PATENT DOCUMENTS

| | | |
|---|---|---|
| DE | 29901516 U1 | 4/1999 |
| DE | 102012024113 A1 | 6/2014 |
| EP | 1582776 A2 | 10/2005 |
| EP | 1662120 A3 | 11/2011 |
| FR | 2962179 A1 | 1/2012 |
| JP | H05-196113 A | 8/1993 |
| JP | 2009210019 A | 9/2009 |
| WO | 201151047 | 5/2011 |

OTHER PUBLICATIONS

English abstract for DE-102012024113.
English abstract for FR-2962179.
English abstract for CN-102797795.
English abstract for JP-H05-196113.
European office action dated Jan. 3, 2019.
English abstract for JP-2009210019.
Third Party Observation for Application No. EP-16750752.4 received from the European Patent Office dated Feb. 25, 2020.

* cited by examiner

ACTUATOR FOR ADJUSTING AN ACTUATING DEVICE

CROSS-REFERENCE TO RELATED APPLICATIONS

This application claims priority to International Patent Application No. PCT/EP2016/068669, filed on Aug. 4, 2016, and German Patent Application No. DE 10 2015 215 732.6, filed on Aug. 18, 2015, the contents of both of which are hereby incorporated by reference in their entirety.

TECHNICAL FIELD

The present invention relates to an actuator for adjusting an actuating element, in particular of a motor vehicle, and a method for producing such an actuator. The invention further relates to a motor vehicle comprising such an actuator.

BACKGROUND

Generic actuators serve the purpose of adjusting an actuating element. For this, such actuators usually have a servomotor, which drives in input shaft. This drive is able to be transmitted via a gear unit to an output shaft, which is connected to such an actuating element and thus adjusts the actuating element. Such gear units are usually equipped with gears engaging into one another for transmitting the drive, which in particular enable a transmission of the drive.

Such an actuator is known for example from DE 299 01 516 U1. This actuator serves for adjusting a throttle valve of a motor vehicle as actuating element and has a servomotor with an input shaft, the drive of which is transmitted to an output shaft via a three-stage gear unit. For this, a gear shaft is arranged between the input shaft and the output shaft, wherein the respective shaft is provided with at least one gear, which engages into a gear of the radially adjacent shaft.

From EP 1 662 120 B1 a further such actuator is known for adjusting a throttle valve as actuating element of a motor vehicle, which has a servomotor with an input shaft and two gear shafts, wherein the gear shafts and the input shaft are respectively radially spaced apart and have gears engaging into one another, which form a multi-stage gear unit. An output shaft of the actuator is mounted coaxially to one of the gear shafts and rotatably relative to this gear shaft.

In actuators from the prior art, therefore, an increasing number of shafts, spaced apart axially parallel and radially, is necessary for realizing a multi-stage gear unit. It applies here that the more stages, the more such shafts are required.

In a variety of applications, in which such actuators come into use, in particular in a motor vehicle, attention is to be paid to a reduction of the installation space requirement of such an actuator and/or a reduction of the weight of the actuator. However, these requirements are inconsistent with the increasing installation space requirement and/or weight of the actuators in multi-stage gear units.

SUMMARY

The present invention is therefore concerned with the problem of indicating for an actuator of the type named in the introduction, for a method for producing such an actuator, and for a motor vehicle comprising such an actuator, improved or at least different embodiments, which are distinguished in particular by a reduced installation space requirement and/or a reduced weight.

This problem is solved according to the invention by the subjects of the independent claim(s). Advantageous embodiments are the subject of the dependent claims.

The present invention is based on the general idea of arranging, in an actuator for adjusting an actuating element, at least one intermediate unit for forming a gear unit of the actuator coaxially to an output shaft of the actuator, and to mount it rotatably with respect to the output shaft and to mount at least one other intermediate unit for forming the gear unit axially parallel to an input shaft of the actuator and rotatably with respect to the input shaft.

Hereby, at least one such intermediate unit can be arranged coaxially to the output shaft, so that a radially spaced arrangement of this at least one intermediate unit to the output shaft is dispensed with. In particular, additional gear shafts arranged spaced apart radially to the output shaft for mounting these intermediate units can be dispensed with. As a result, a reduced installation space requirement of the actuator arises, in particular a reduced installation space requirement in radial direction. In addition, the dispensing with said gear shafts leads to a reduced weight of the actuator.

In accordance with the idea of the invention, the actuator has a servomotor which has and drives the input shaft. The input shaft is therefore in particular a motor shaft of the servomotor. The output shaft is axially parallel and radially spaced apart from the input shaft and is rotatably mounted. An input gear is mounted on the input shaft, while an output gear is mounted on the output shaft. The input gear forms here the first member of the gears of the gear unit, while the output gear forms the last member of the gears of the gear unit and turns the output shaft. The rotation of the output shaft is used here for adjusting the actuating element. The actuator has in addition at least one such intermediate unit, which is arranged axially parallel to the input shaft and is mounted rotatably with respect to the input shaft. Such an intermediate unit is designated in the following as input intermediate unit. The respective input intermediate unit has a first input gear and a second input gear, which are arranged axially adjacent and are non-rotatably connected to one another. The actuator has in addition at least one such intermediate unit, which is arranged coaxially to the output shaft and is mounted rotatably with respect to the output shaft and is designated in the following as output intermediate unit. The respective output intermediate unit has a first output gear and a second output gear, which are arranged axially adjacent and are non-rotatably connected to one another. Here, one of the output gears of such an output intermediate unit engages with the input gear mounted non-rotatably on the input shaft, while one of the input gears of such an input intermediate unit engages with the output gear mounted non-rotatably on the output shaft. This means that the rotation of the input shaft is transmitted via the input gear to the intermediate units, which transmit this drive to the output shaft via the output gear. For this, the other input gears, i.e. all input gears apart from the input gear engaging with the output gear, respectively engage with such an output gear with the exception of the output gear engaging with the input gear.

The respective input intermediate unit can basically be arranged spaced apart radially from the input shaft. Embodiments are preferred here in which at least one such input intermediate unit is arranged radially nearer to the input shaft than to the output shaft. In particular, at least one such input intermediate unit is arranged offset radially to the input shaft on the side of the input shaft facing away from the output shaft.

In preferred variants, at least one such input intermediate unit is arranged coaxially to the input shaft. Hereby, in particular, additional gear shafts arranged radially spaced apart from the input shaft for mounting this at least one output intermediate unit can be dispensed with. As a result, a further reduction of the installation space requirement of the actuator arises, in particular in radial direction. It is particularly preferred here if all the input intermediate units are arranged coaxially to the input shaft.

It is advantageous if the actuator has no further intermediate units apart from the at least one input intermediate unit and the at least one output intermediate unit. This means that the actuator has exclusively at least one such input intermediate unit and at least one such output intermediate unit. This also means that all the intermediate units can be arranged respectively coaxially to the input shaft or coaxially to the output shaft. Hereby a further reduction of the installation space requirement of the actuator arises, in particular of the installation space requirement in radial direction.

In addition, it is preferred if the number of input intermediate units corresponds to the number of output intermediate units. Hereby, all the input gears and output gears engage with at least one such gear.

Basically, the respective intermediate unit can be configured having multiple pieces. In particular, it is conceivable to arrange the gears at least of one such intermediate unit in an axially spaced-apart manner. Intermediate units which are configured in a single piece are advantageous. The intermediate units can therefore be constructed in particular from a single material. This results in a stable construction of the intermediate units and therefore of the actuator, and in a reduced axial installation space requirement of the actuator.

For the further reduction of the installation space requirement and/or for the improved transmitting of the drive to the input shaft, it is preferred if the servomotor is arranged coaxially to the input shaft. Here, the servomotor can be configured in any desired manner. In particular, the servomotor can be electrically driven.

Basically, the gears of the respective intermediate unit can have an identical external diameter and/or an identical number of teeth.

It is preferred if the gears at least of one of the intermediate units have different external diameters and/or a different number of teeth. Hereby, by means of the intermediate unit a transmitting of the drive can be realized. In particular, gears engaging into one another can have different external diameters and/or a different number of teeth. When gears engaging into one another have different external diameters and/or a different number of teeth, the gear with the smaller external diameter and/or with the smaller number of teeth is usually designated as a pinion. Accordingly, such a gear unit with gears of different external diameters and/or with a different number of teeth engaging into one another has at least one such gear and at least one such pinion.

The mounting of the respective intermediate unit rotatably to the associated shaft can basically be realized in any desired manner.

It is conceivable that at least one such intermediate unit is mounted on the associated shaft. This means that at least one such input intermediate unit can be mounted on the input shaft. Accordingly, it is conceivable that at least one such output intermediate unit is mounted rotatably on the output shaft. Hereby, the corresponding shaft is therefore used not only for the transmitting of the rotational movement or respectively of a torque, but also for the mounting of the corresponding intermediate unit.

In addition, the solution according to the invention permits the input gear and the output gear to be arranged axially in any desired manner and to position the intermediate units axially with respect to the input gear and to the output gear.

In preferred embodiments, the respective input intermediate unit engages with the axially next adjacent output intermediate unit. Accordingly, the respective output intermediate unit engages with the axially next adjacent input intermediate unit. Hereby, the stages of the gear unit can be realized in an adjacent manner along the axial extent of the actuator.

It is conceivable here that the input gear and the output gear are arranged on axially opposite sides of the gear unit. However, it is also conceivable that at least one such output intermediate unit is arranged on the side of the output gear facing axially away from the input gear, and/or that such an input intermediate unit is arranged on the side of the input gear facing axially away from the output gear.

It is also conceivable that at least one such input intermediate unit is arranged axially between the input gear and the servomotor. In particular, it is conceivable here to mount this input intermediate unit on the input shaft.

In further variants, at least one such intermediate unit is rotatably mounted on a bearing shaft or on a pin. This means that at least one such output intermediate unit can be mounted on an associated pin arranged non-rotatably in the actuator. This pin is preferably arranged coaxially to the output shaft, wherein the output shaft is rotatable with respect to this pin. In particular, it is conceivable to arrange this pin rigidly in the actuator.

In addition, it is conceivable to mount at least one such input intermediate unit on a pin arranged non-rotatably in the actuator, wherein the input shaft is rotatable with respect to the pin. This means that the input shaft and the pin are separate components of the actuator. Here, the pin can be arranged in particular rigidly in the actuator. The pin is arranged axially parallel to the input shaft. This means that the pin can be arranged radially offset to the input shaft. Hereby, it is also possible to achieve a better clearance compensation between input shaft, output shaft and pin and/or a reduced tensioning between input shaft, output shaft and pin. It is preferred if the pin and the input shaft are coaxially arranged. The coaxial arrangement of the pin to the input shaft leads in particular to a more compact construction of the actuator.

Such a pin, on which such an input intermediate unit is mounted, is advantageously mounted radially in the actuator. It is conceivable here that a pot-shaped or bell-shaped cover at least partially surrounds the input gear and has a cover wall spaced apart axially from the input gear and running radially, which cover wall comprises a mounting opening. Here, the pin can be radially mounted in said mounting opening. The mounting opening is arranged coaxially to the pin. This means that the mounting opening is arranged axially parallel, preferably coaxially to the input shaft. It is also conceivable to additionally mount the bearing shaft radially in a bearing region spaced apart from the mounting opening. The respective radial mounting in particular prevents here radial stresses from occurring between the associated input intermediate unit and the output intermediate unit engaging therewith, and/or the output gear, which can lead to a bending stress and to an impairment in the operation of the actuator.

The respective gear can basically be configured so as to be closed in radial direction. It is also conceivable to configure at least one such gear as a gear segment. This means that at least one of the gears can extend by less than 360° in circumferential direction. In particular, it is conceivable to configure the output gear as such a gear segment. Hereby, in particular further weight savings can be achieved.

The actuator preferably has an actuator housing, in which the components of the actuator can be arranged. In the actuator housing in particular the input shaft, the output shaft, the intermediate units and the input gear and the output gear can be arranged. It is also conceivable to arrange the servomotor in the actuator housing.

The actuator housing can have a first housing part and a second housing part. Here, the second housing part can close the first housing part. The housing can also consist here of further housing parts. In particular, it is conceivable to configure the first housing part as a housing pot and the second housing part as a housing cover closing the housing pot. The input shaft and/or the output shaft can be rotatably mounted here in the housing. In particular, it is conceivable to mount the output shaft rotatably in the first housing part, in the second housing part or in both housing parts. In particular, it is conceivable to mount the output shaft rotatably exclusively in one of the housing parts.

The output shaft is advantageously guided through the housing, in particular through one of the housing parts, in particular projects through this. Hereby, the rotation of the output shaft can be picked up outside the actuator housing and can be used for adjusting the actuating element. The output shaft can be guided here through the actuator housing in the axially opposite direction from the servomotor. It is also conceivable that the output shaft is guided out from the actuator housing on the axially same side of the actuator housing on which the servomotor is arranged.

The first housing part, in particular the housing pot, preferably has a pot in which the servomotor is arranged. Therefore, a substantial spatial separation is achieved between the servomotor and the intermediate units or respectively the gear unit.

The pot preferably has on the side facing the second housing part a pot base, which has a pot opening for the input shaft. On the side lying opposite the pot base, the pot is configured so as to be open or respectively has a mounting opening through which the servomotor can be mounted, in particular inserted, into the pot. Therefore it is possible in particular to mount the servomotor together with the input shaft through the mounting opening into the first housing part, whereas the other shafts, intermediate units and the pin are mounted into the housing from the opposite side. Therefore, an improved aligning of the servomotor is produced. When the output shaft and/or the pin are mounted in the first housing part, a particularly advantageous and exact aligning of the servomotor results.

In advantageous embodiments, the actuator has a magnet and a magnetic sensor cooperating with the magnet, which serve for determining a rotation rate and/or a torque and/or a rotation speed of the output shaft.

Preferably, the magnet is mounted, in particular non-rotatably, on the output shaft. In addition, it is preferred if the magnetic sensor is arranged spaced apart from the output shaft in the actuator housing, in particular is mounted on the actuator housing.

Variants prove to be advantageous in which the actuator is provided with a bearing arrangement separate from the actuator housing for mounting of the output shaft. The bearing arrangement is preferably arranged and/or received in the actuator housing.

It is conceivable that the bearing arrangement receives an end of the output shaft facing the bearing arrangement. It is preferred if the bearing arrangement also receives the magnet, which in turn can be received in the output shaft.

Embodiments are preferred here, in which the bearing arrangement has at least one portion which is arranged between the magnet and the magnetic sensor, in order in particular to prevent or at least reduce electrostatic discharges. Therefore in particular corresponding damage and or impairments to the magnetic sensor are thus prevented.

It is conceivable to provide the bearing arrangement with a base, which is arranged between the magnet and the magnetic sensor.

The bearing arrangement can be configured so as to be pot-shaped here, wherein the base is a bearing base of the bearing arrangement, which bearing base is arranged axially between the magnet and the magnetic sensor. The bearing base is advantageously constructed axially adjacent to the magnetic sensor and/or closed.

Variants are also to be considered, in which the bearing arrangement has a first bearing pot and a second bearing pot, which are axially separated by a dividing wall of the bearing arrangement, wherein the end of the output shaft, in particular also the magnet, are mounted in the first bearing pot, which is open towards the output shaft. The magnet sensor is preferably surrounded by the second bearing pot, which is adjacent towards the magnet sensor. The second bearing pot can surround the magnetic sensor here both entirely and also partially.

In these variants, the magnet and the magnetic sensor can therefore be arranged axially adjacent.

The second bearing pot can have a radial opening, designated feedthrough opening in the following, which allows the magnetic sensor to be introduced into the second bearing pot or respectively to be removed from the second bearing pot. Alternatively or additionally, the feedthrough opening serves for the feeding through of connections, in particular electrical connections, of the magnetic sensor.

The actuator can be used for adjusting any desired actuating element. The actuator preferably comes into use in a motor vehicle. Here, the actuator is preferably used for adjusting an actuating element for the dosing or respectively regulating of a fluid flow.

For example, it is conceivable that the associated motor vehicle has an exhaust turbocharger, wherein the actuator is used for adjusting at least one actuating element of the exhaust turbocharger. Embodiments are to be considered in which the exhaust turbocharger has a variable turbine geometry, wherein the variable turbine geometry is adjusted by the actuator. Exhaust turbochargers are also to be considered, which have a wastegate valve, wherein the actuator adjusts the wastegate valve.

In further embodiments, the motor vehicle has a fresh air system for the delivering of fresh air to an internal combustion engine of the motor vehicle. Here, the fresh air system is provided with a valve which serves for the dosing of the fresh air supply to the internal combustion engine. Such a valve, in particular a throttle valve, can be actuated here by means of the actuator. In particular, it is conceivable to adjust such a valve of a suction tube of the fresh air system by means of the actuator.

Alternatively or additionally, the motor vehicle can have an exhaust recirculation arrangement for the recirculating of exhaust gas to the internal combustion engine. The exhaust recirculation arrangement is provided with such an actuating element, which serves for the dosing of the exhaust recirculation to the internal combustion engine. Such an actuator is used here for adjusting the actuating element. Such an actuating element can be configured in particular as a valve, for example as a recirculation valve.

Of course, it is also possible to adjust two or more such actuating elements by means of such an actuator. It is also conceivable to equip the motor vehicle with two or more such actuators, wherein the respective actuator adjusts at least one such actuating element.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically

DETAILED DESCRIPTION

Figure 1:
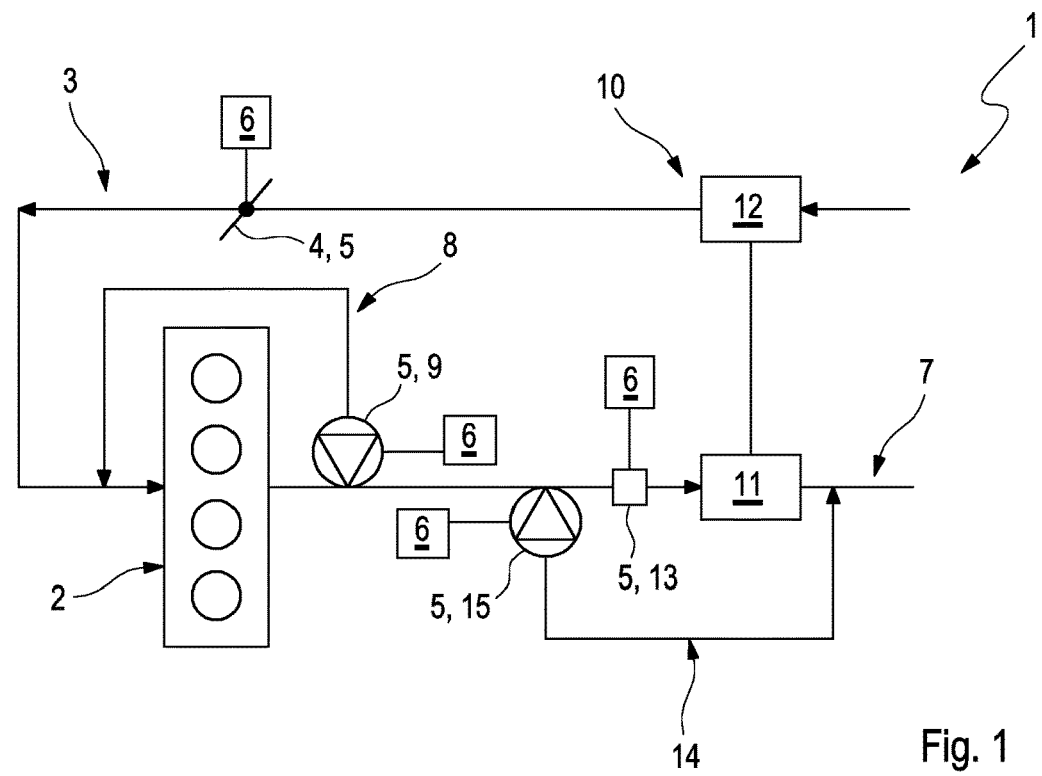
FIG. 1 a highly simplified, circuit diagram-like illustration of a motor vehicle, FIG. 2 a section through an actuator of the motor vehicle, FIG. 3 a detail of a three-dimensional interior view of the actuator, FIG. 4 a three-dimensional interior view of the actuator, FIG. 5 the view of FIG. 2 in a different example embodiment of the actuator, FIG. 6 the section of FIG. 5 in a further example embodiment of the actuator, FIG. 7 a three-dimensional exploded illustration of the actuator of FIG. 2, FIG. 8 a detail of FIG. 2 in a further example embodiment of the actuator, FIG. 9 the actuator of FIG. 8 in a three-dimensional view into the interior of the actuator, FIG. 10 a detail of FIG. 8 in another example embodiment of the actuator.

In FIG. 1 a motor vehicle 1 with an internal combustion engine 2 is illustrated, which can serve for the drive of the motor vehicle 1. In operation of the internal combustion engine 2, fresh air is required, which is delivered to the internal combustion engine 2 via a fresh air system 3. For the dosing of the fresh air which is delivered to the internal combustion engine 2, an actuating element 5, configured as a throttle valve 4, is arranged within the fresh air system 3. The throttle valve 4 is adjusted here by means of an actuator 6. In operation of the internal combustion engine 2, exhaust gas occurs, which is discharged via an exhaust system 7. By means of an exhaust recirculation arrangement 8, it is possible to feed exhaust gas to the internal combustion engine 2 again. For this, the exhaust recirculation arrangement 8 branches off from the exhaust system 7 and opens out into the fresh air system 3. In the exhaust recirculation arrangement 8 a recirculation valve 9 is provided as actuating element 5, which serves for the dosing of the exhaust gas return to the internal combustion engine 2. The recirculation valve 9 as actuating element 5 is adjusted by means of such an actuator 6. To increase efficiency, the motor vehicle 1 has an exhaust turbocharger 10 with a turbine wheel 11 and a compressor wheel 12. The turbine wheel 11 is integrated here in the exhaust system 7 and drives the compressor wheel 12, which is integrated in the fresh air system 3, in order to compress the fresh air which is to be delivered to the internal combustion engine 2. To vary the action upon the turbine wheel 11 with exhaust gas, the exhaust turbocharger 10 has a variable turbine geometry 13 and a wastegate valve arrangement 14. By means of the variable turbine geometry 13, a cross-section, able to be flowed through, to the turbine wheel 11 is able to be adjusted. The adjusting of the variable turbine geometry 13 and therefore the adjusting of the cross-section which is able to be flowed through takes place by means of such an actuator 6. This means that the variable turbine geometry 13 as actuating element 5 is adjusted by means of the actuator 6. The wastegate valve arrangement 14 branches off from the exhaust system 7 upstream of the turbine wheel 11 and leads into the exhaust system 7 again downstream of the compressor wheel 11. Hereby, it is possible to direct the exhaust gas past the compressor wheel 11, wherein a wastegate valve 15 is provided as actuating element 15 for the dosing of the exhaust gas which is directed past the compressor wheel 11. The wastegate valve 15 as actuating element 5 is adjusted here by means of such an actuator 6.

Figure 2:
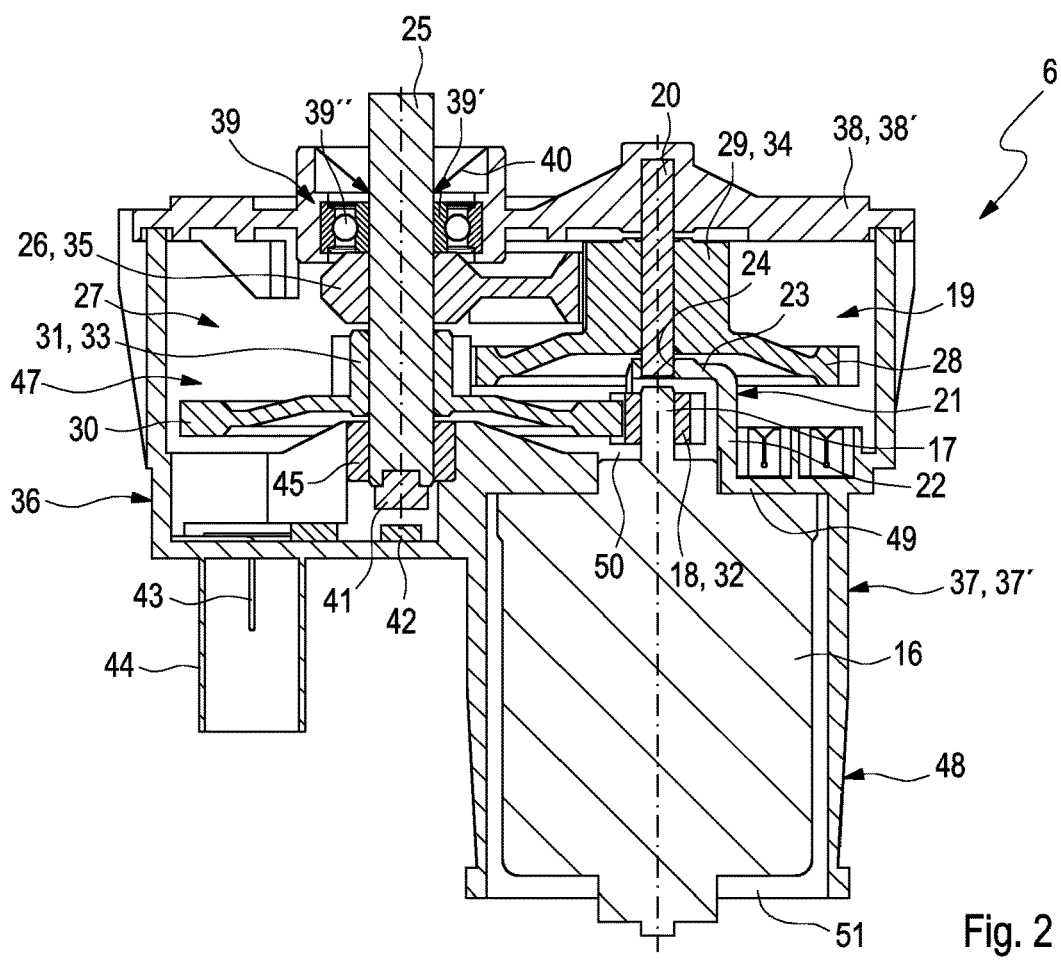
Figure 3:
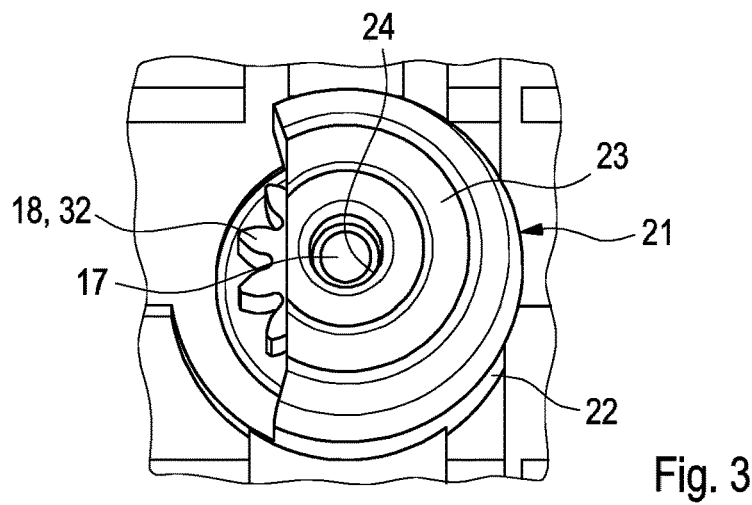
Figure 4:
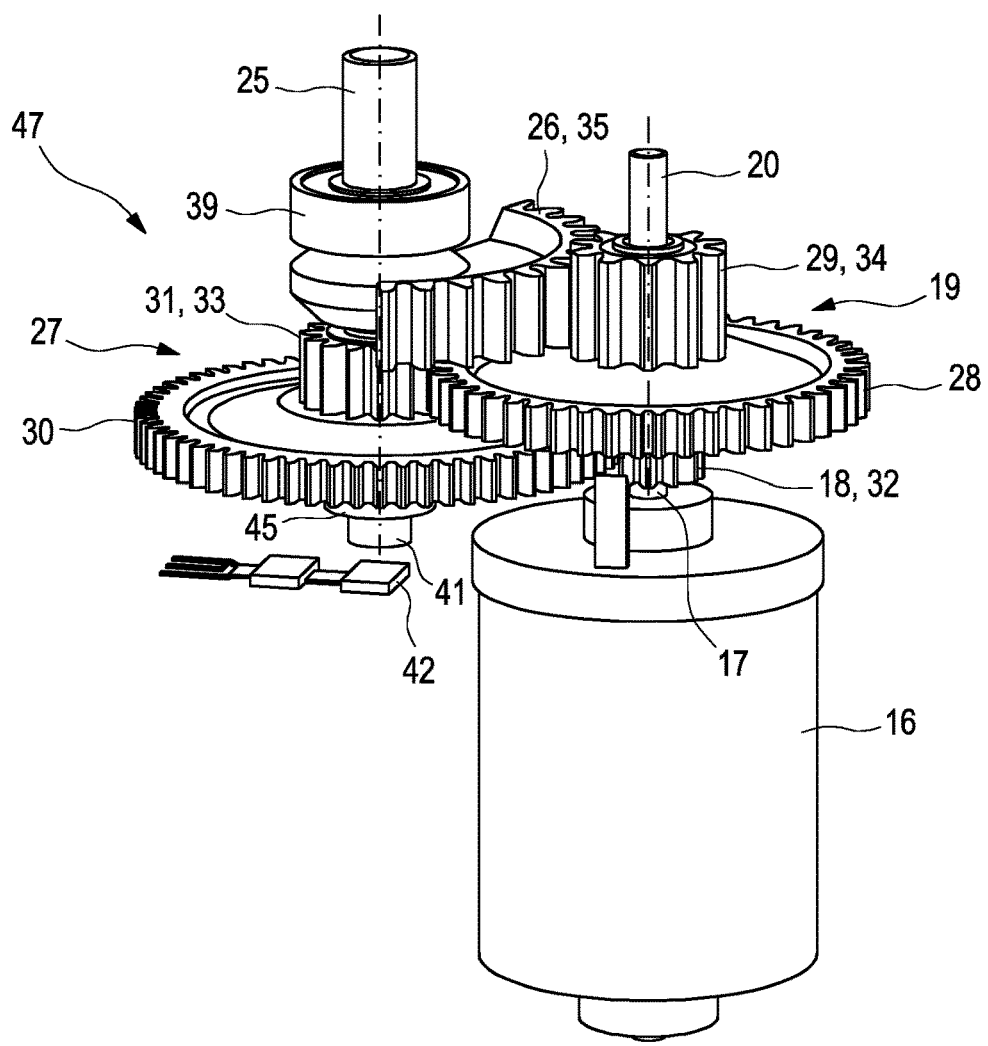

The actuator 6 is illustrated in FIGS. 2 to 4, wherein FIG. 2 shows a section through the actuator 6, while different three-dimensional interior views of the actuator 6 are to be seen in FIG. 3 and in FIG. 4, wherein in FIGS. 3 and 4 not all the components are illustrated which are visible in FIG. 2. The actuator 6 has a servomotor 16 with a driven input shaft 17 or motor shaft 17. The input shaft 17 is connected to an input gear 18, which is non-rotatably mounted on the input shaft 17. Hereby, on rotation of the input shaft 17 a corresponding rotation of the input gear 18 occurs. An input intermediate unit 19 is arranged axially parallel to the input shaft 17 and mounted rotatably with respect to the input shaft 17. For this, a pin 20 which is separate from the input shaft 17 is provided, which is held non-rotatably in the actuator 6, so that the input shaft 17 is rotatable with respect to the pin 20. The pin 20 is arranged axially parallel to the input shaft 17, and is spaced apart axially from the input shaft 17. Here, the input intermediate unit 19 is mounted rotatably on the pin 20. In the example embodiment which is shown, the input intermediate unit 19 and the pin 20 are arranged coaxially to the input shaft 17. Hereby, in particular a more compact construction of the actuator 6 is possible.

As can be seen from FIGS. 2 and 3, the input gear 18 is partially surrounded by a cover 21, which is configured in a bell-shaped or respectively pot-shaped manner. The cover 21 has a side wall 22 running in circumferential direction and a cover wall 23 adjoining thereto, wherein the cover wall 23 runs radially and in circumferential direction. In the cover wall 23 a mounting opening 24 is provided, which is arranged spaced apart axially from the input shaft 17 and from the input gear 18, coaxially to the pin 20. In the example which is shown, the mounting opening 24 is therefore arranged coaxially to the input shaft 17. Here, the pin 20 is mounted in the mounting opening 24 radially, for example by means of a radial bearing which is not shown. In FIG. 3, a lateral top view onto the cover 21 can be seen here, in which, for better understanding, the pin 20 is not illustrated. In particular, it can be seen here from FIG. 3 that the cover 21 only partially surrounds the input gear 18, in such a way that the cover 21 is configured so as to be laterally open, so that the input gear 18 projects radially out from the cover 21 on the open side.

The actuator 6 has in addition an output shaft 25, which is arranged axially parallel to the input shaft 17 and spaced apart radially to the input shaft 17. The output shaft 25 is rotatably mounted in the actuator 6, wherein an output gear 26 is non-rotatably mounted on the output shaft 25. The output shaft 25 is rotated by means of the output gear 26, in order to adjust such an actuating element 5. Here, the drive of the servomotor 16 is transmitted to the output shaft 25 via the output gear 26. For this, the actuator 6 has an output intermediate unit 27, which is arranged coaxially to the output shaft 25 and is rotatably mounted with respect to the output shaft 25.

The input intermediate unit 19 has a first input gear 28 and a second input gear 29. The input gears 28, 29 are axially adjacent and connected non-rotatably to one another, wherein the input intermediate unit 19, in the example shown, is constructed in a single piece or respectively from a single material. Here, the input gears 28, 29 have different external diameters.

The output intermediate unit 27 has a first output gear 30 and a second output gear 31. The output gears 30, 31 are axially adjacent and connected non-rotatably to one another, wherein the output intermediate unit 31, in the example shown, is constructed in a single piece or respectively from a single material. Here, the first output gear 30 and the second output gear 31 have different external diameters.

The input gear 18 engages with the first output gear 30 of the output intermediate unit 27, such that the input gear 18 drives the first output gear 30. As a result, the second output gear 31 rotates, which engages with the axially adjacent first input gear 28. The rotation of the output intermediate unit 27, which is rotatably mounted with respect to the output shaft 25, leads to a corresponding rotation of the first input gear 28, which engages with the second output gear 31. As a result, the second input gear 29 rotates. The second input gear 29 engages with the output gear 26, so that the rotation of the input intermediate unit 19, which is rotatably mounted with respect to the input shaft 17, leads to a corresponding rotation of the output gear 26. Hereby, the output shaft 25, on which the output gear 26 is non-rotatably mounted, is rotated accordingly, wherein this rotation is used for adjusting such an actuating element 5. The input gear 18 and the output gear 26 therefore realize together with the intermediate units 19, 27 a gear unit 47, which is configured in the present case having three stages, wherein for this only two shafts 17, 25, spaced apart radially from one another, are necessary. In the gear unit 47, the input gear 18 forms the first member and the output gear 26 forms the last member of the gears 18, 26, 28, 29, 30, 31.

It can be seen here that the gears 18, 26, 28, 29, 30, 31 engaging with one another have different external diameters and a different number of teeth. The input gear 18 therefore has a smaller external diameter and has a smaller number of teeth than the first output gear 30, so that the input gear 18 functions as an input pinion 32. The second output gear 31 has a smaller external diameter than the first input gear 29, engaging with the second output gear 31. Accordingly, the second output gear 31 is an output pinion 33. In addition, the second input gear 29 is smaller with regard to the external diameter than the output gear 26, so that the second input gear 29 functions as input pinion 34. As can be seen in particular from FIG. 4, it can be seen in addition that the respective pinion 32, 33, 34 has a smaller number of teeth than the associated gear 26, 28, 30. In addition, it can be seen from FIG. 4 that the output gear 26 is configured as a gear segment 35, which extends by less than 180° in circumferential direction.

As can be seen in FIG. 2, the actuator 6 has an actuator housing 36, which comprises a first housing part 37, for example a housing pot 37', and a second housing part 38, for example a housing cover 38', closing or covering the first housing part 37. The servomotor 16, the input gear 18, the output gear 26 and the intermediate units 19, 27 are arranged in the first housing part 37. The output shaft 25 is directed through the second housing part 38 and is rotatably mounted by means of a bearing arrangement 39, which can have a bearing element 39' such as a ball bearing 39". The output shaft 25 therefore projects through the actuator housing 36, wherein the torque of the output shaft 25 is used outside the actuator housing 36 for adjusting the actuating element 5. In the example shown, the bearing arrangement 39 is received in the second housing part 38, wherein the output shaft 25 is additionally rotatably mounted in the first housing part 37 by means of a bearing arrangement 45 which is separate from the actuator housing 36. The bearing arrangement 45 is, in particular, a sliding bearing arrangement 45', in which the output shaft 25 is slidingly mounted. On the side of the ball bearing 39" facing axially away from the first housing part 37, in addition a ring seal 40 is provided. On the end facing axially away from the second housing part 38, the output shaft 25 is provided with a magnet 41, which is non-rotatably mounted on the output shaft 25. The magnet 41 non-rotatably mounted on the output shaft 25 cooperates with a magnetic sensor 42, in order for example to determine a rotation rate and/or rotation speed and/or a rotation angle of the output shaft 25. The magnetic sensor 42 is able to be connected via a connection pin 43, which is arranged in a connection socket 44, to a control which is not shown, to which the data determined by the magnetic sensor 42 are conveyed. The magnetic sensor 42 is mounted here, on the side of the first housing part 37 facing the magnet 41, lying opposite the magnet 41, in the first housing part 37. The bearing arrangement 45 and the magnetic sensor 42 are mounted here on the same housing part 37. Here, the output shaft 25 is mounted in a portion facing or respectively adjacent to the magnetic sensor 42 by means of the bearing arrangement 45 in the first housing part 37.

In addition, it can be seen from FIGS. 2 and 3 that the cover 21 is configured in a single piece i.e. in particular from a single material. Here, the open side of the cover 21 faces the radially adjacent first output gear 30, so that the input gear 18 and the first output gear 30 engage into one another without difficulty. In addition, it can be seen that the cover 21 and the first housing part 37 are also constructed in a single piece or respectively from a single material. The actuator housing 36 can be made from plastic here, wherein it is conceivable in particular to produce the first housing part 37 and/or the second housing part 38 as injection moulded parts.

In addition, it can be seen from FIG. 2 that the pin 20 is arranged non-rotatably in the second housing part 38. For this, the pin 20 can be injected, glued or pressed into the second housing part 38. It is conceivable here to mount the pin 20 radially in the first housing part 37 in addition to the radial mounting in the mounting opening 24 of the cover 21.

Figure 5:
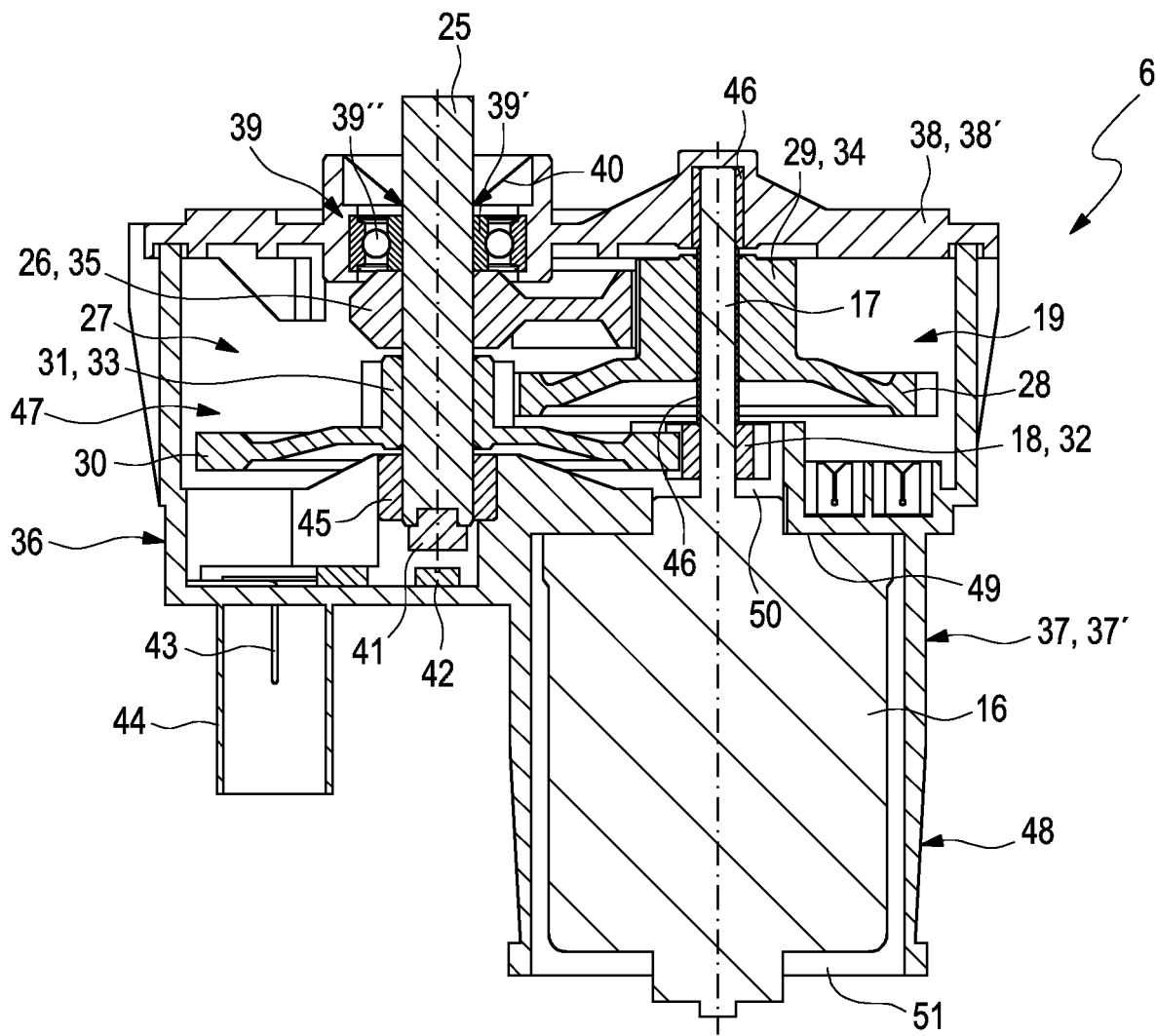

In FIG. 5 a different example embodiment of the actuator 6 is illustrated. This example embodiment differs from the example embodiment shown in FIGS. 2 to 4 in particular in that the input intermediate unit 19 is mounted on the input shaft 17 rotatably with respect to the input shaft 17. Here, the input shaft 17 extends into the second housing part 38 and is rotatably mounted in the second housing part 38. For this, a bearing arrangement 46 is provided radially between the second housing part 38 and the input shaft 17. Accordingly, the pin 20 of FIG. 2 is dispensed with. Also no cover 21 is provided in this example embodiment.

Figure 6:
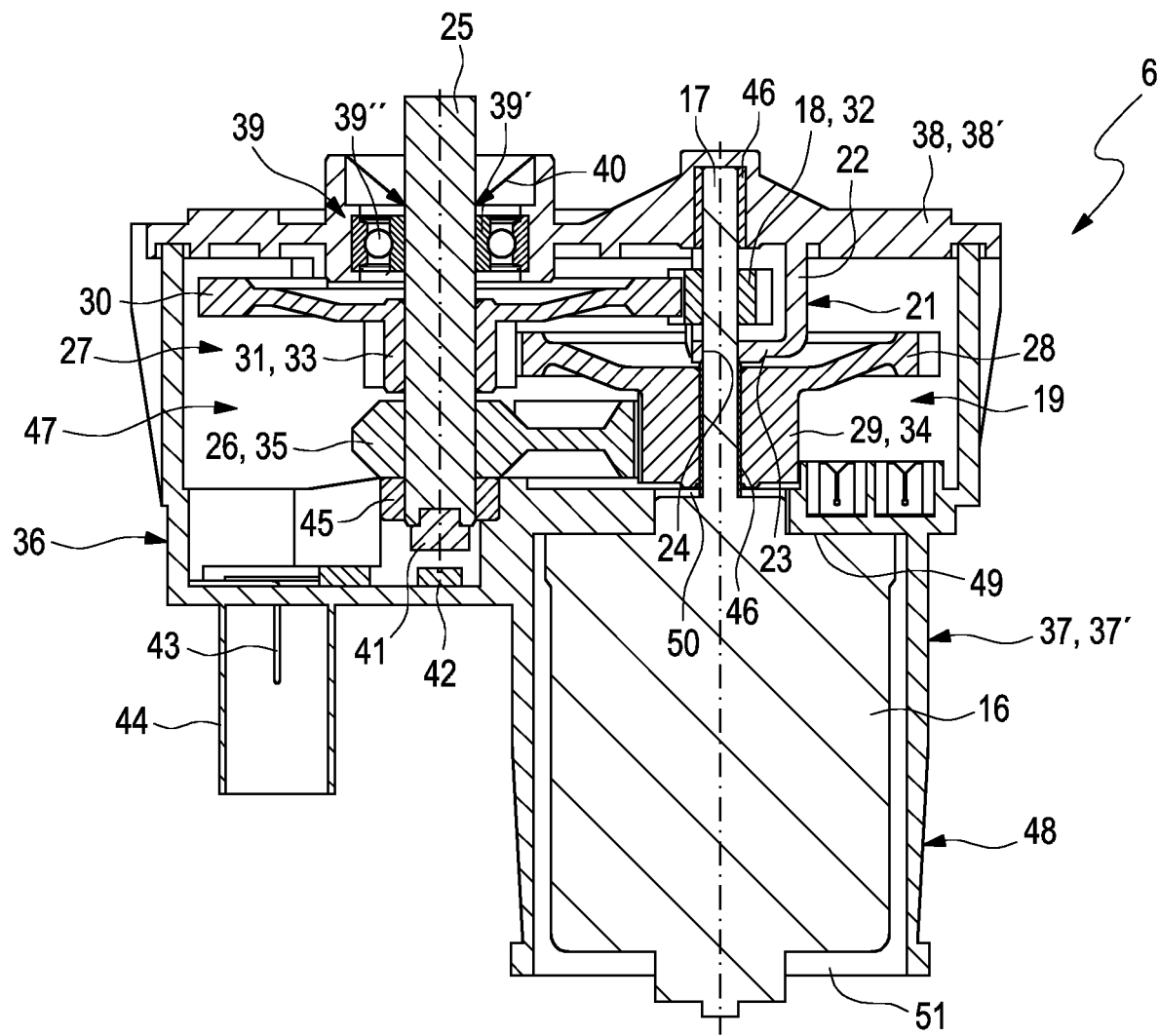

A further example embodiment of the actuator 6 is illustrated in FIG. 6. This example embodiment differs from the example embodiment shown in FIG. 5 in particular in that the input intermediate unit 19 is arranged axially between the input gear 18 and the servomotor 16. This means that the input gear 18 and input intermediate unit 19 are arranged inversely in axial direction compared to FIG. 5. Accordingly also the output gear 26 and output intermediate unit 27 are arranged inversely in axial direction.

In all the embodiments of the actuator 6 which are shown, the intermediate units 19, 27 together with input gear 18 and output gear 26 therefore form a three-stage gear unit 47. It is, of course, possible here, through the addition of further input intermediate units 19 and output intermediate units 27, to realize gear units 47 with higher stages, wherein for this the number of input intermediate units 19 preferably corresponds to the number of output intermediate units 27. An increase of the stage of the gear unit 47 does not lead here to an expansion of the actuator 6 in radial direction. This means that the installation space requirement of the actuator 6, in particular in radial direction, is kept small. Furthermore, additional shafts for bearing further intermediate units 19, 27 are dispensed with, so that also the weight of the actuator 6 is reduced.

Figure 7:
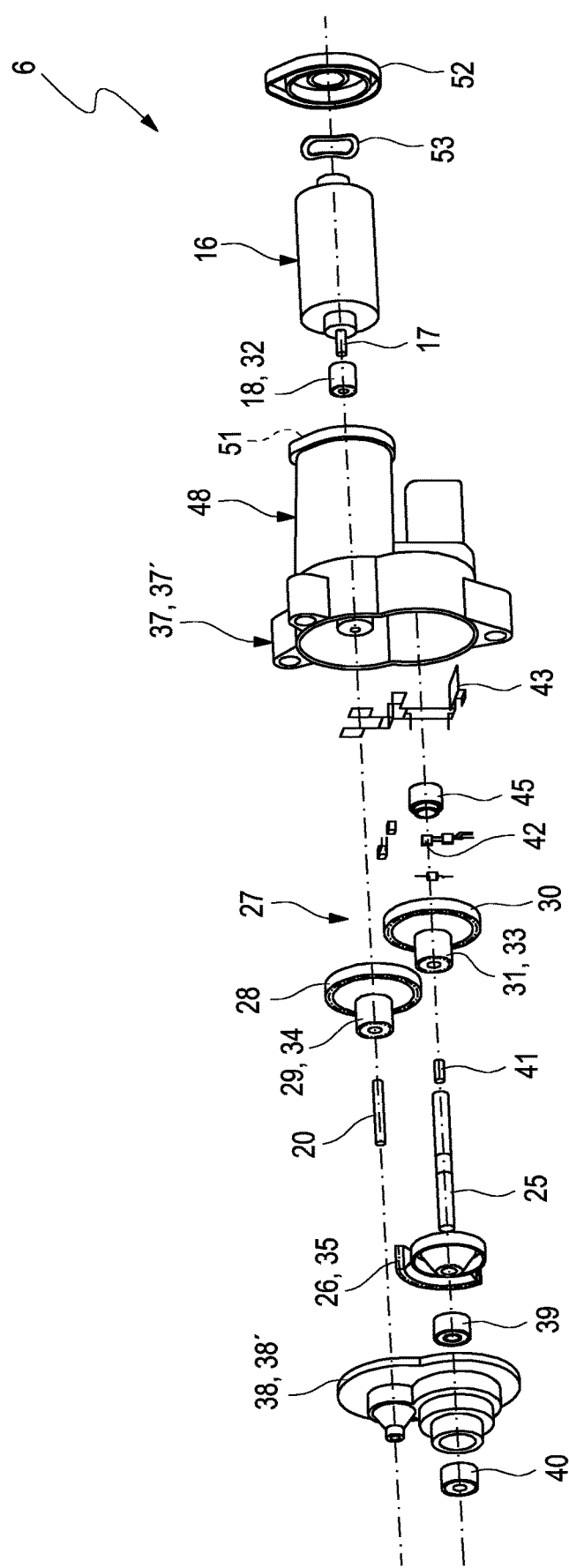

In the examples shown, the first housing part 37 or respectively the housing pot 37" has a pot 48, in which the servomotor 16 is arranged. The pot 48 has a pot base 49 with a pot opening 50 for the input shaft 17, through which the input shaft 17 is directed. The pot 48 is configured so as to be open on the side lying opposite the pot base 49 and therefore facing away from the second housing part 38, or respectively has a mounting opening 51 on this side. The servomotor 16 on mounting of the actuator 6 is inserted into the housing part 37 through the mounting opening 51 and is thus mounted. Thus, as can be seen in FIG. 7, the servomotor 16 with the input shaft 17 and the input gear 18 is mounted through the mounting opening 51 into the actuator housing 36, while the output shaft 25, the intermediate units 19, 27 and if applicable the pin 20 are mounted into the actuator housing 36 from the side of the housing 36 facing away. In addition to a simple mounting of the actuator 6, this leads to an advantageous and exact aligning of the servomotor 16. This aligning is further improved in the examples in which the output shaft 25 and/or the pin 20 are mounted in the first housing part 37, therefore in particular in the example shown in FIGS. 2 and 7.

As can be seen in particular from FIG. 7, after the mounting of the servomotor 16, the mounting opening 51 can be closed by a cover 52, wherein a spring element 53 can be arranged axially between the servomotor 16 and the cover 52.

In the example shown in FIG. 2 and FIG. 6, the cover 21 is formed on the side of the pot base 49 facing away from the mounting opening 51, protruding from an edge of the pot opening 50 in the direction of the pin 20. Here, the pot opening 50 and the mounting opening 24 are arranged in an aligned manner, in particular coaxially.

Figure 8:
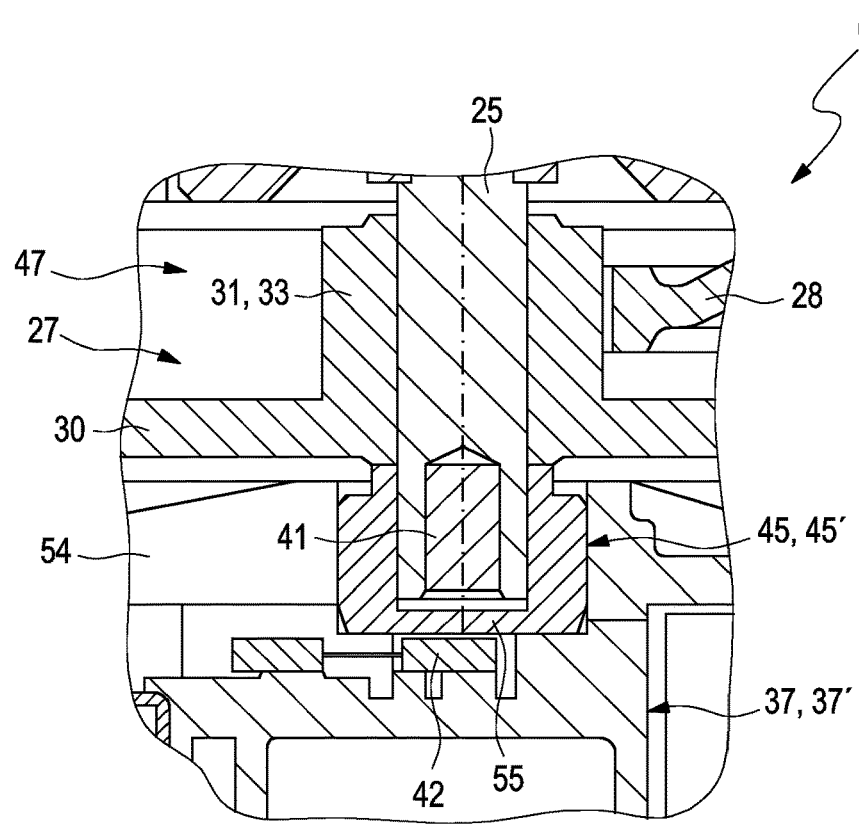
Figure 9:
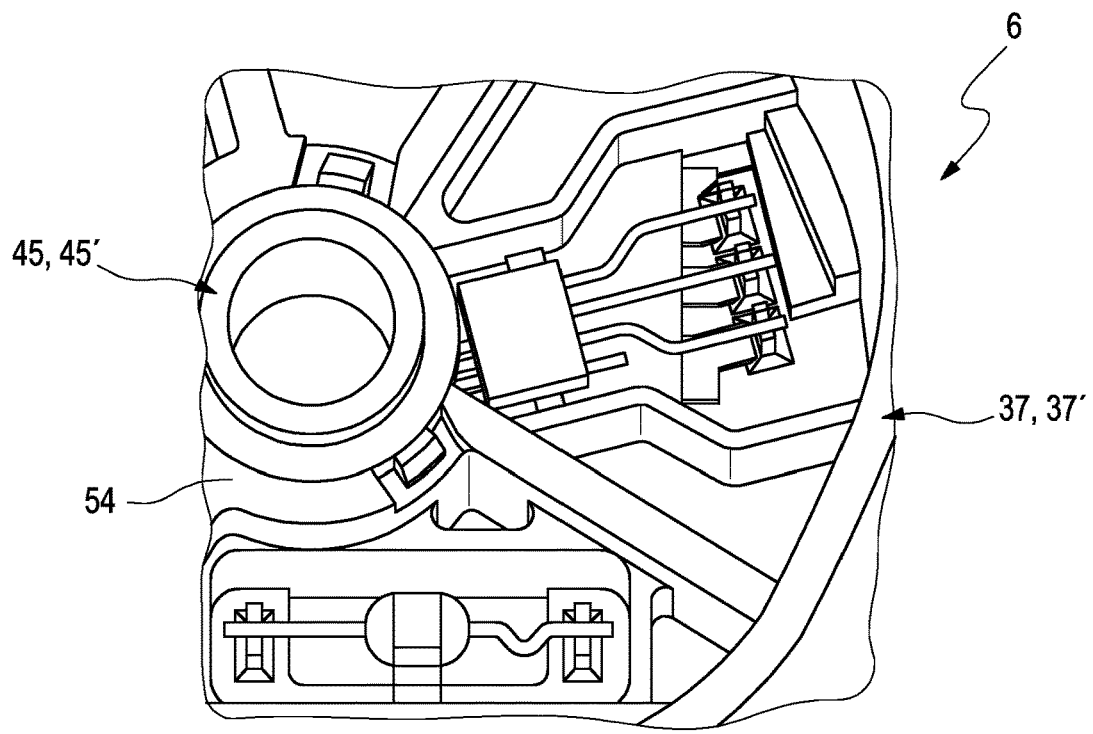

FIGS. 8 and 9 show a detail of FIG. 2 in the region of the magnet 41 and of the magnetic sensor 42 in a further example embodiment of the actuator 6. In this example embodiment, the bearing arrangement 45 is received in a ring segment-like bearing portion 54 of the first housing part 37. In the example shown, the bearing portion 54 is formed in one piece on the first housing part 37, in particular is injected thereon. The bearing arrangement 45 is configured so as to be pot-shaped and open towards the output shaft 25 and has a bearing base 55 facing the magnetic sensor 42 and spaced apart axially from the magnetic sensor 42. The end of the output shaft 25 axially facing the magnetic sensor 42, and the magnet 41 received in the output shaft 25, are arranged in the bearing arrangement 45. This makes it possible in particular to subsequently mount the magnetic sensor 42 or respectively to introduce it into the actuator housing 36. The bearing base 55 is configured so as to be closed and thus separates the magnet 41 from the magnetic sensor 42. Thus, in particular, an electrostatic discharge damaging the magnetic sensor 42 is prevented or at least reduced.

Figure 10:
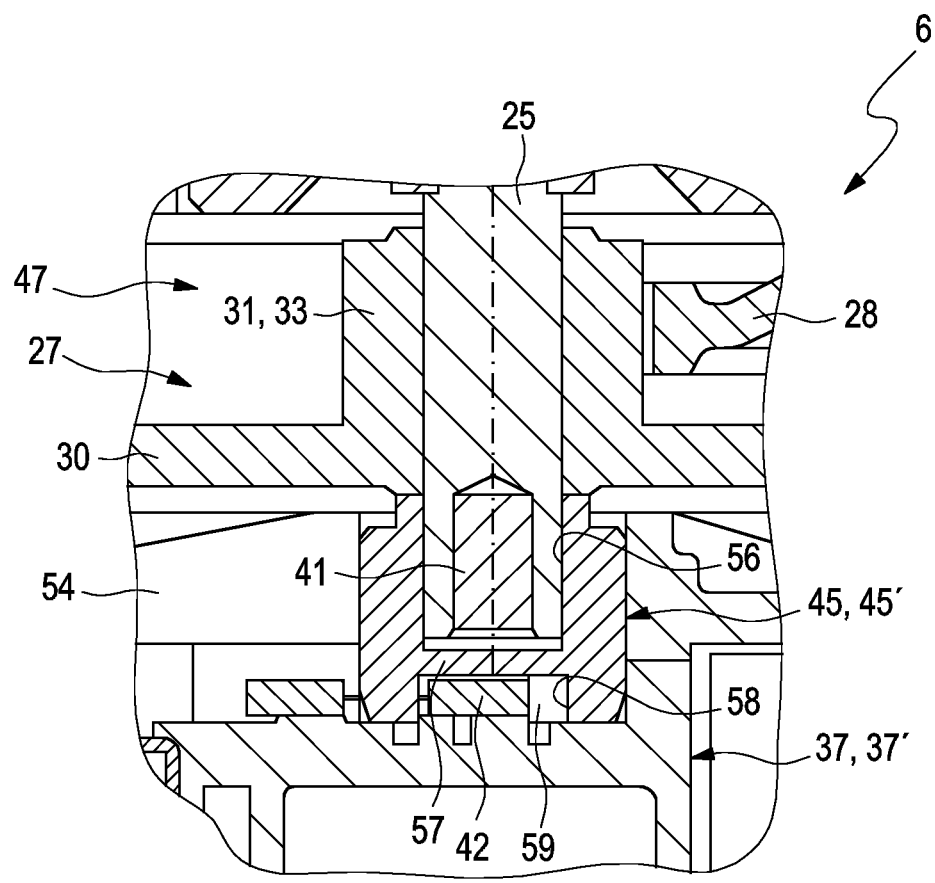

In the example embodiment shown in FIG. 10, the sliding bearing arrangement 45 is configured with an H-shaped cross-section, which is visible in FIG. 10. Thus, the bearing arrangement 45 has a first bearing pot 56, which is open towards the output shaft 25 and in which the end of the output shaft 25, axially facing the bearing arrangement 45, together with the magnet 41 received therein, is mounted. The first bearing pot 56 is separated from a second bearing pot 58 of the bearing arrangement 45 by a dividing wall 57, which second bearing pot is open towards the magnetic sensor 42 and surrounds the magnetic sensor 42. The dividing wall 57 is preferably configured so as to be closed and provides for a protection of the magnetic sensor 42 with respect to electrostatic discharges. Here, the bearing arrangement 45 with the second bearing pot 58 strikes axially against the first housing part 37. On the second bearing pot 58 a radial feedthrough opening 59 is provided, through which the magnetic sensor 42 can be mounted and/or connections of the magnetic sensor 42 can be directed.

The invention claimed is:

1. A motor vehicle comprising:
at least one actuating element;
at least one actuator for adjusting the at least one actuating element;
the at least one actuator including a servomotor, the servomotor including an input shaft;
the at least one actuator including an output shaft rotatably mounted axially parallel to the input shaft and radially spaced apart from the input shaft;
the at least one actuating element drivingly connected to the output shaft, the output shaft configured to adjust the at least one actuating element;
the at least one actuator including an input gear non-rotatably mounted on the input shaft;
the at least one actuator including an output gear non-rotatably mounted on the output shaft;
the at least one actuator including at least one input intermediate unit including a first input gear and a second input gear arranged axially adjacent to one another and non-rotatably connected to one another;
the at least one actuator including at least one output intermediate unit including a first output gear and a second output gear arranged axially adjacent to one another and are non-rotatably connected to one another;
wherein the at least one input intermediate unit is arranged axially parallel to the input shaft and is rotatably mounted with respect to the input shaft;
wherein the at least one output intermediate unit is arranged coaxially to the output shaft and is rotatably mounted with respect to the output shaft;
wherein the second input gear engages the output gear;
wherein the first output gear engages the input gear; and wherein the first input gear engages the second output gear.

2. The motor vehicle according to claim 1, wherein the at least one input intermediate unit is arranged coaxially to the input shaft.

3. The motor vehicle according to claim 1, wherein at least one of:
the at least one input intermediate unit is rotatably mounted on the input shaft; and
the at least one output intermediate unit is roatably mounted on the output shaft.

4. The motor vehicle according to claim 1, wherein the at least one input intermediate unit is mounted on a pin arranged non-rotatably in the actuator and coaxially to the input shaft.

5. The motor vehicle according to claim 1, wherein the input gear and the output gear are arranged axially opposite one another.

6. The motor vehicle according to claim 1, wherein the at least one input intermediate unit is rotatably mounted on the input shaft axially between the input gear and the servomotor.

7. The motor vehicle according to claim 1, wherein at least the output gear is configured as a gear segment extending in a circumferential direction less than 360°.

8. The motor vehicle according to claim 1, further comprising an actuator housing in which the at least one input intermediate unit and the at least one output intermediate unit are arranged, wherein the actuator housing includes a first housing part and a second housing part closing the first housing part, and wherein the output shaft is rotatably mounted in at least one of the first housing part and the second housing part.

9. The motor vehicle according to claim 8, wherein:
the first housing part includes a pot in which the servomotor is arranged;
the pot includes, on a side adjacent the second housing part, a pot base including a pot opening; and
the pot further includes a mounting opening arranged opposite the pot opening, the mounting opening configured to mount the servomotor within the pot.

10. The motor vehicle according to claim 8, wherein the at least one actuator further includes a magnet non-rotatably mounted on the output shaft, and a magnetic sensor configured to determine a rotation angle of the output shaft.

11. The motor vehicle according to claim 10, wherein the at least one actuator further includes a bearing arrangement separate from the actuator housing, the bearing arrangement mounted on one of the first housing part and the second housing part and configured to receive i) an axial end of the output shaft facing the bearing arrangement and ii) the magnet.

12. The motor vehicle according to claim 11, further comprising a second bearing arrangement separate from the actuator housing, the second bearing arrangement coupled to the second housing part, wherein the output shaft extends through the second bearing arrangement, and wherein the bearing arrangement is mounted on the first housing part and includes a bearing base arranged axially between the magnet and the magnetic sensor, and axially spaced apart from the magnetic sensor.

13. The motor vehicle according to claim 11, wherein the bearing arrangement includes a first bearing pot and a second bearing pot opening in opposing directions, the first bearing pot and the second bearing pot axially separated from one another by a dividing wall of the bearing arrangement, the dividing wall defining a pot base of the first bearing pot and a pot base of the second bearing pot, wherein the axial end of the output shaft and the magnet are mounted in the first bearing pot, and the second bearing pot at least partially surrounds the magnetic sensor.

14. The motor vehicle according to claim 1, further comprising an exhaust turbocharger, wherein the actuating element is one of:
a variable turbine geometry of the exhaust turbocharger;
a wastegate valve of the exhaust turbocharger; and
a valve of a flow separation of the exhaust turbocharger.

15. The motor vehicle according to claim 1, further comprising a fresh air system for delivering fresh air to an internal combustion engine, wherein the at least one actuating element is a valve of the fresh air system for a dosing of a fresh air supply to the internal combustion engine.

16. The motor vehicle according to claim 1, further comprising an exhaust recirculation arrangement for recirculating exhaust gas to an internal combustion engine, wherein the at least one actuating element is a recirculation valve for a dosing of an exhaust recirculation to the internal combustion engine.

17. A method for producing an actuator of a motor vehicle, comprising:
providing:
an actuator housing including a first housing part and a second housing part closing the first housing part, the first housing part including a pot, the pot including a pot base on a side facing the second housing part, the pot base including a pot opening and a mounting opening arranged opposite the pot opening;
at least one input intermediate unit including a first input gear and a second input gear arranged axially adjacent to one another and non-rotatably connected to one another;
at least one output intermediate unit including a first output gear and a second output gear arranged axially adjacent to one another and non-rotatably connected to one another;
a servomotor including an input shaft, the input shaft including an input gear non-rotatably mounted thereon;
an output shaft including an output gear non-rotatably mounted thereon, the output shaft drivingly connected to at least one actuating element and configured to adjust the at least one actuating element;
inserting the servomotor together with the input shaft into the actuator housing through the mounting opening of the first housing part and mounting the servomotor within the pot;
mounting the output shaft within the actuator housing from a side of the actuator housing facing away from the mounting opening such that the output shaft is rotatably mounted axially parallel to the input shaft and radially spaced apart from the input shaft;
mounting the at least one input intermediate unit within the actuator housing from the side of the actuator housing facing away from the mounting opening such that the at least one input intermediate unit is arranged axially parallel to the input shaft and is rotatably mounted with respect to the input shaft; and
mounting the at least one output intermediate unit within the actuator housing from the side of the actuator housing facing away from the mounting opening such that the at least one output intermediate unit is arranged coaxially to the output shaft and is rotatably mounted with respect to the output shaft, wherein the second input gear engages the output gear, and the first input gear engages the second output gear, and wherein the first output gear engages the input gear, and the second output gear engages the first input gear.

18. The method according to claim 17, wherein inserting the servomotor together with the input shaft into the actuator housing through the mounting opening further includes inserting the input gear into the actuator housing through the mounting opening of the first housing part.

19. The motor vehicle according to claim 1, wherein:
the second input gear directly engages the output gear;
the first output gear directly engages the input gear; and
the first input gear directly engages the second output gear.

20. The motor vehicle according to claim 9, wherein the input shaft protrudes from a side of the pot base opposite the servomotor via the pot opening.

21. The motor vehicle according to claim 10, wherein the first housing part includes a connection socket opening toward an exterior of the actuator housing and a pin arranged in the connection socket, the pin operatively connected to the magnetic sensor.

* * * * *